(12) United States Patent
Shiina et al.

(10) Patent No.: US 12,063,065 B2
(45) Date of Patent: Aug. 13, 2024

(54) TERMINAL DEVICES, COMMUNICATION METHODS, AND COMMUNICATION SYSTEMS

(71) Applicant: NIPPON TELEGRAPH AND TELEPHONE CORPORATION, Tokyo (JP)

(72) Inventors: Ryota Shiina, Musashino (JP); Tomohiro Taniguchi, Musashino (JP); Kazutaka Hara, Musashino (JP); Shinya Tamaki, Musashino (JP); Tomoki Murakami, Musashino (JP); Toshiro Nakahira, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 243 days.

(21) Appl. No.: 17/784,931

(22) PCT Filed: Dec. 16, 2019

(86) PCT No.: PCT/JP2019/049199
§ 371 (c)(1),
(2) Date: Jun. 13, 2022

(87) PCT Pub. No.: WO2021/124407
PCT Pub. Date: Jun. 24, 2021

(65) Prior Publication Data
US 2023/0022598 A1    Jan. 26, 2023

(51) Int. Cl.
*H04B 10/11* (2013.01)
*H04W 12/06* (2021.01)

(52) U.S. Cl.
CPC ............ *H04B 10/11* (2013.01); *H04W 12/06* (2013.01)

(58) Field of Classification Search
CPC .............................. H04B 10/11; H04W 12/06
USPC ........................................................ 398/115
See application file for complete search history.

(56) References Cited

U.S. PATENT DOCUMENTS

| | | | |
|---|---|---|---|
| 11,929,001 B2* | 3/2024 | Kim | G09G 3/3406 |
| 11,929,781 B2* | 3/2024 | Shiina | H04B 10/85 |
| 2012/0128367 A1 | 5/2012 | Yamada | |
| 2018/0139202 A1 | 5/2018 | Sethi et al. | |

FOREIGN PATENT DOCUMENTS

| | | |
|---|---|---|
| JP | 201715621 A | 1/2017 |
| WO | WO-2011080867 A1 | 7/2011 |
| WO | WO-2013051677 A1 | 4/2013 |

* cited by examiner

*Primary Examiner* — Mohammad R Sedighian
(74) *Attorney, Agent, or Firm* — Harness, Dickey & Pierce, P.L.C.

(57) ABSTRACT

An object of the present invention is to provide a terminal device, a communication method, and a communication system which are capable of reducing the error rate even if the transmitting side and the receiving side are asynchronous. The terminal device, communication method, and communication system according to the present invention sample an optical signal more finely than a 0/1 bit pattern in optical ID estimation processing for determining which of 1/0 the data acquired by an optical sensor is, and perform a majority decision using a plurality of sampling values in a decision processing window. Thus, even if the correct sampling value fails to be obtained, the correct bit value can be derived from other samplings.

6 Claims, 12 Drawing Sheets

Fig. 10

| SERIAL NO. | OPTICAL ID | CONNECTION OPERATION AND AUTHENTICATION INFORMATION FOR RF COMMUNICATION | | | | | |
|---|---|---|---|---|---|---|---|
| | | PROTOCOL | FREQUENCY | CHANNEL | SSID | PASSWORD | ... | PRIORITY |
| 1 | 111010 | 802.11n | 2.4GHz | ... | ... | ... | ... | 2 |
| 2 | 000101 | 802.11ac | 5GHz | ... | ... | ... | ... | 1 |
| ... | | | | | | | | |

TERMINAL DEVICES, COMMUNICATION METHODS, AND COMMUNICATION SYSTEMS

CROSS-REFERENCE TO RELATED APPLICATIONS

This application is a 371 U.S. National Phase of International Application No. PCT/JP2019/049199, filed on Dec. 16, 2019. The entire disclosure of the above application is incorporated herein by reference.

TECHNICAL FIELD

The present disclosure relates to an optical/RF wireless hybrid communication between a base station and a terminal device.

BACKGROUND ART

In the description herein, a direction from a base station to a terminal device is referred to as a "downlink", and a direction from a terminal device to a base station is referred to as an "uplink".

For a wireless communication system such as Wi-Fi, there is known an optical/RF wireless hybrid communication in which connection authentication data such as an SSID and a password (PW) required for connecting a base station and a terminal device is notified to the terminal device by using an optical wireless communication (downlink communication using an LED lighting or the like) (e.g., see PTL 1). The optical/RF wireless hybrid communication has an advantage of allowing the terminal device user to connect to the Wi-Fi just by entering an optical wireless communication area without grasping the SSID and PW and then performing an operation for inputting them or the like.

CITATION LIST

Patent Literature

[PTL 1] U.S. Patent Application Publication No. 2018/0139202

SUMMARY OF THE INVENTION

Technical Problem

In the optical/RF wireless hybrid communication, instead of connection and authentication information itself for the RF communication is not transmitted by the optical wireless communication, an optical ID having a small amount of data corresponding to the information is transmitted. The optical transmitter of the base station transmits data with a color or brightness change under conditions that humans cannot perceive the optical ID. Both the base station and the terminal device have a correspondence list between the optical ID and the connection and authentication information, and the terminal device extracts the connection and authentication information corresponding to the received optical ID from the correspondence list and performs an RF communication according to that information.

Such an optical/RF wireless hybrid communication has an advantage that a light source for both optical wireless communication and lighting can be used in the base station and a standard terminal device such as smartphone can be used at the terminal device side because the connection and authentication control for RF communication is performed using optical signals. It also has an advantage of reducing equipment installation costs and power consumption.

In connection and authentication operation using an optical ID, a terminal device such as a smartphone reads a change in light illuminance or a change in color by using its own illuminance sensor, and performs binary conversion on the change based on a certain threshold value to receive optical ID information.

In this case, if the communication is via a wireless LAN or Ethernet communication, the frame transmitting side adds a preamble, which is a synchronization code, to the beginning of each transmission frame so that the clock frequency can be synchronized between the frame receiving side and the frame transmitting side. This synchronization between the frame receiving side and the frame transmitting side makes it possible to reduce the error rate at the time of frame transmission.

However, in the case of optical wireless communication, data is transmitted and received within a range (up to about 10 Hz) in which the data can be detected by an optical sensor such as a camera or illuminance sensor mounted on a terminal such as a smartphone, and as a result, the transmission speed is as very low as several bps to several tens of bps. Therefore, in order to synchronize the transmitting side and the receiving side in an optical wireless communication, it is required for user authentication to take longer time by the amount of the preamble. If the transmitting side and the receiving side are not synchronized, the time required for user authentication can be reduced, but the following problems occur.

FIG. 7 is an illustration for explaining problems to be solved by the present invention. For example, consider a case where a 1/0 transmission pattern and a sampling interval (1/0 correspond to each other at a ratio of 1:1 (one sampling is performed for one bit). FIGS. 7 (A) and 7 (B) illustrate a case where each sampling point is in one intra-bit, and FIG. 7 (C) illustrates a case where each sampling point is in an inter-bit.

In the cases of FIGS. 7 (A) and 7 (B), each bit value can be expressed by a sampling value. On the other hand, in the case as illustrated in FIG. 7 (C), sampling is performed at the time between bits, at which an error is likely to occur in the determination of 1/0. The time segment in which an error is likely to occur in the determination of 1/0 at sampling is now referred to as an "uncertain segment".

As described above, in an optical wireless communication in which the transmitting side and the receiving side are not synchronized, there is a problem that the error rate may increase due to a time lag between the transmission pattern and the sampling points. Further, there is also a problem that the sampling values may fail to be correctly binarized due to changes in the light intensity of the received optical signal or the influence of noise.

Therefore, in order to solve the above problems, an object of the present invention is to provide a terminal device, a communication method, and a communication system which are capable of reducing the error rate even if the transmitting side and the receiving side are asynchronous.

Means for Solving the Problem

In order to achieve the above object, a terminal device according to the present invention samples an optical signal much more finely than a 1/0 transmission pattern, and performs a majority decision using a plurality of sampling values.

Specifically, a terminal device according to the present invention is a terminal device that communicates with a base station by an optical wireless communication and an RF (Radio Frequency) wireless communication, and includes:
- an optical sensor that receives an optical signal of the optical wireless communication from the base station;
- a determination unit that samples illuminances of the optical signal at sampling points more finely than a bit pattern of the optical signal to acquire sampling values, and compares the sampling values with a certain threshold value to convert the optical signal into binary values; and
- an estimation unit that has a determination time shorter than a time width of one bit of the bit pattern and longer than a time corresponding to a sum of intervals of the sampling points included in the one bit of the bit pattern, and estimates ID information included in the optical signal in such a manner that a major value of the binary values included in the determination time is set as a value of the one bit.

Further, a communication method according to the present invention is a communication method in which communication between a terminal device and a base station is performed by an optical wireless communication and an RF wireless communication, and includes:
- by the terminal device,
- receiving an optical signal of the optical wireless communication from the base station;
- sampling illuminances of the optical signal at sampling points more finely than a bit pattern of the optical signal to acquire sampling values;
- comparing the sampling values with a certain threshold value to convert the optical signal into binary values;
- setting a determination time shorter than a time width of one bit of the bit pattern and longer than a time corresponding to a sum of intervals of the sampling points included in the one bit of the bit pattern; and
- estimating ID information included in the optical signal in such a manner that a major value of the binary values included in the determination time is set as a value of the one bit.

Further, a communication system according to the present invention is a communication system in which communication between a terminal device and a base station is performed by an optical wireless communication and an RF wireless communication, wherein
the terminal device includes:
- an optical sensor that receives an optical signal of the optical wireless communication from the base station;
- a determination unit that samples illuminances of the optical signal at sampling points more finely than a bit pattern of the optical signal to acquire sampling values, and compares the sampling values with a certain threshold value to convert the optical signal into binary values; and
- an estimation unit that has a determination time shorter than a time width of one bit of the bit pattern and longer than a time corresponding to a sum of intervals of the sampling points included in the one bit of the bit pattern, and estimates ID information included in the optical signal in such a manner that a major value of the binary values included in the determination time is set as a value of the one bit.

The terminal device, the communication method, and the communication system according to the present invention acquire a plurality of sampling values for each bit of a transmission pattern, and set a major value of determination values (1/0) for the bit as a value of the bit. Thus, even if the correct sampling value fails to be obtained, the correct bit value can be derived from other samplings. Therefore, according to the present invention, it is possible to provide a terminal device, a communication method, and a communication system which are capable of reducing the error rate even if the transmitting side and the receiving side are asynchronous.

Further, the terminal device according to the present invention further includes:
- a list describing a correspondence between ID information and authentication information for starting the RF wireless communication;
- an analysis unit that refers to the list for the ID information estimated by the estimation unit to acquire the corresponding authentication information; and
- an RF transmission and reception unit that transmits the authentication information acquired by the analysis unit to the base station by the RF wireless communication.

Note that the above inventions can be combined as much as possible.

Effects of the Invention

According to the present invention, it is possible to provide a terminal device, a communication method, and a communication system which are capable of reducing the error rate even if the transmitting side and the receiving side are asynchronous.

BRIEF DESCRIPTION OF DRAWINGS

FIG. 10 is a flowchart illustrating a communication method according to the present invention.

DESCRIPTION OF EMBODIMENTS

Figure 1:
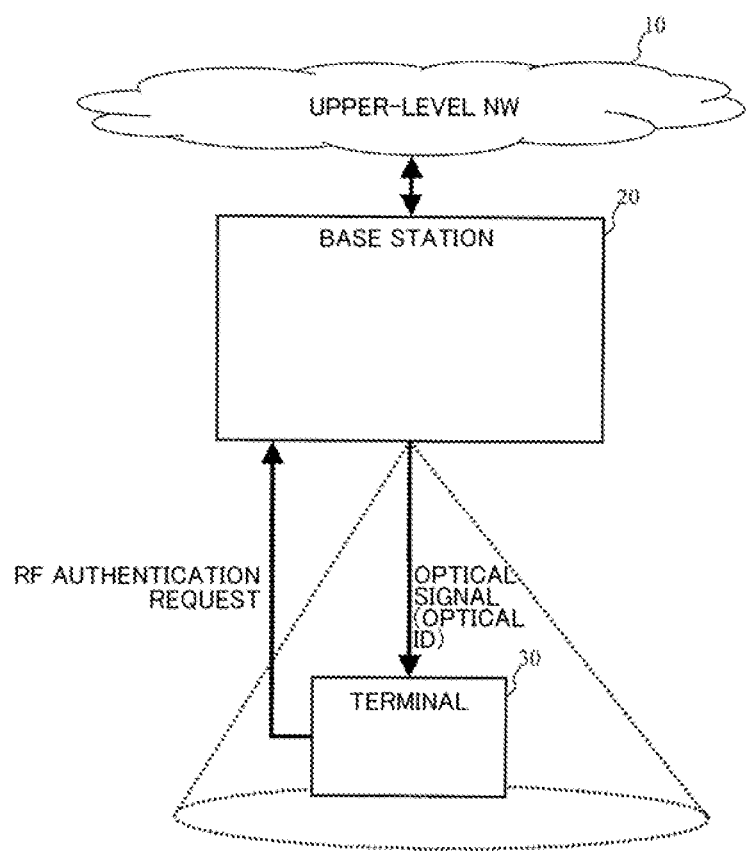
FIG. 1 is a diagram illustrating a communication system according to the present invention.

Embodiments of the present invention will be described with reference to the accompanying drawings. The embodiments described below are examples of the present invention, and the present invention is not limited to the following embodiments. Note that, in the description herein and the drawings, the components having the same reference numerals indicate the same components.

First Embodiment

FIG. 1 is a diagram illustrating a communication system 301 according to a first embodiment. The communication system 301 is a communication system that performs communication between a base station 20 and a terminal device 30 by an optical wireless communication and an RF wireless communication.

The base station 20 transmits as an optical signal an optical ID corresponding to connection and authentication information for RF transmission and reception to the terminal device 30 that is present in a predetermined area 40.

The terminal device 30 uses the connection and authentication information for RF transmission and reception corresponding to the received optical ID to transmit an authentication request to an appropriate base station 20.

Figure 2:
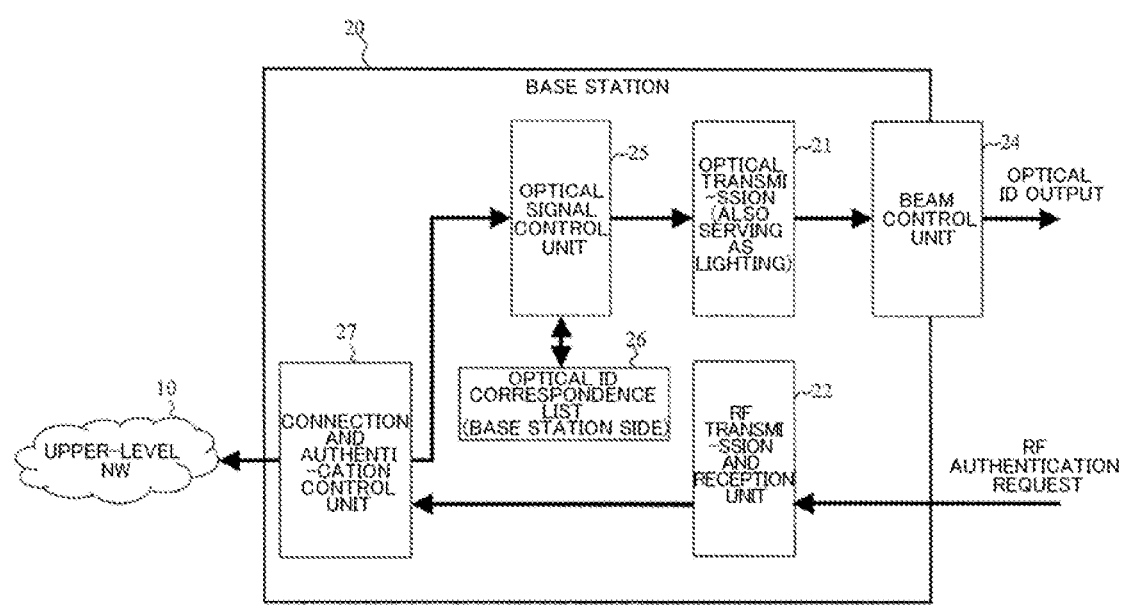
FIG. 2 is a diagram illustrating a configuration of a base station of the communication system according to the present invention.

FIG. 2 is a diagram illustrating a configuration of the base station 20. The base station 20 includes an optical transmitter 21, an RF transmission and reception unit 22, a beam control unit 24, an optical signal control unit 25, an optical ID correspondence list 26, and a connection and authentication control unit 27.

The connection and authentication control unit 27 manages connection operation and authentication information for RF communication. Note that the connection operation refers to what type of wireless protocol/IF is permitted and prioritized for connection. The authentication information refers to information such as an SSID (Service Set Identifier), an ID (identification number), a password, and the like.

Further, the connection and authentication control unit 27 receives an RF authentication request from the terminal device 30, and permits the terminal device 30 for which it has been confirmed that the authentication information in the request matches the authentication information held by the connection and authentication control unit 27 to communicate with an upper-level NW 10.

The optical signal control unit 25 refers to the optical ID correspondence list 26 for the connection operation and authentication information notified from the connection and authentication control unit 27, and extracts the corresponding optical ID. Then, the optical signal control unit 25 modulates a signal with a signal pattern for the extracted optical ID. A modulation condition for this modulation is that the output light from the optical transmission unit 21 cannot be perceived by humans. Note that the optical ID correspondence list 26 is a list in which the connection operation and authentication information for RF transmission and reception and the optical ID are associated with each other.

The optical transmitter 21 uses a light source such as an LED that can be dimmed or toned. The light source may also serve as a lighting application. The optical transmitter 21 converts the optical ID (modulated signal) from the optical signal control unit 25 into an optical signal having a predetermined wavelength, power, modulation method, or data rate. In the present embodiment, a case will be described in which the optical transmitter 21 transmits an optical signal (an optical signal modulated with an optical ID under the above condition) so that the illuminance is equal to or higher than a certain level within the predetermined area 40.

The beam control unit 24 controls the beam shape so that the optical signal from the optical transmitter 21 can reach the predetermined area 40, and then transmits the optical signal to the space. If there are no obstacles that block the light, the optical signal reaches all terminal devices 30 in the predetermined area 40.

The RF transmission and reception unit 22 transmits and receives RF signals using a predetermined protocol (Wi-Fi, LTE, etc.). The RF transmission and reception unit 22 may support a plurality of wireless standards (Wi-Fi 2.4 GHz/5 GHz, etc.).

Figure 3:
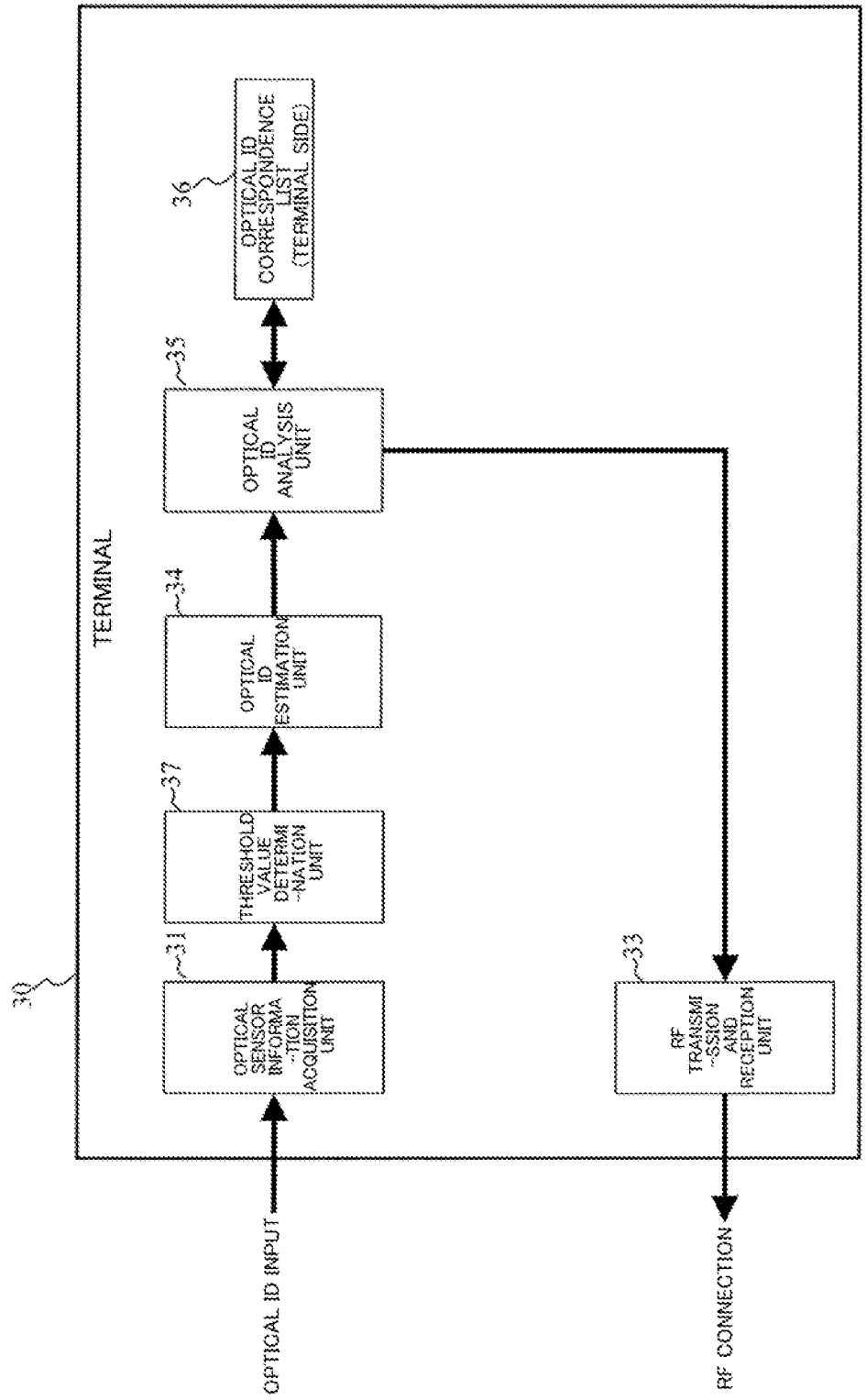
FIG. 3 is a diagram illustrating a configuration of a terminal device of the communication system according to the present invention.

FIG. 3 is a diagram illustrating a configuration of the terminal device 30. The terminal device 30 includes:
an optical sensor (an optical sensor information acquisition unit 31) that receives an optical signal of the optical wireless communication from the base station 20;
a determination unit (a threshold value determination unit 37) that samples illuminances of the optical signal at sampling points more finely than a bit pattern of the optical signal to acquire sampling values, and compares the sampling values with a certain threshold value to convert the optical signal into binary values (0/1); and
an estimation unit (an optical ID estimation unit) that has a determination time shorter than a time width of one bit of the bit pattern and longer than a time corresponding to a sum of intervals of the sampling points included in the one bit of the bit pattern, and estimates ID information included in the optical signal in such a manner that a major value of the binary values included in the determination time is set as a value of the one bit.

The terminal device 30 also further includes:
a list (an optical ID correspondence list 36) describing a correspondence between ID information and authentication information for starting the RF wireless communication;
an analysis unit (an optical ID analysis unit 35) that refers to the list for the ID information estimated by the estimation unit to acquire the corresponding authentication information; and
an RF transmission and reception unit 33 that transmits the authentication information acquired by the analysis unit to the base station by the RF wireless communication.

The optical sensor information acquisition unit 31 converts the optical signal from the optical transmitter 21 into an electric reception signal to be acquired as a light illuminance value. The optical sensor information acquisition unit 31 is not limited to an optical receiver dedicated to the optical wireless communication, and if the terminal device 30 is a smart phone, its camera function may be used.

Figure 4:
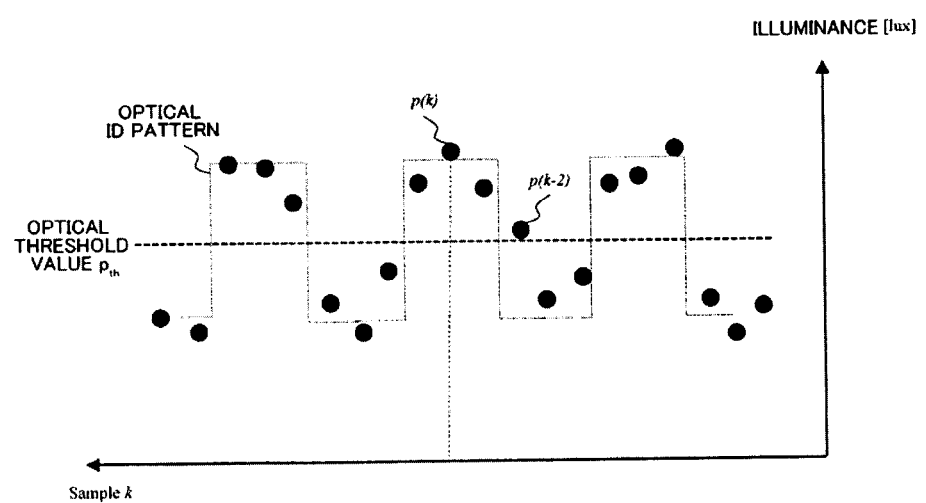
FIG. 4 is an illustration for explaining the illuminance of an optical signal received by the terminal device according to the present invention.
Figure 5:
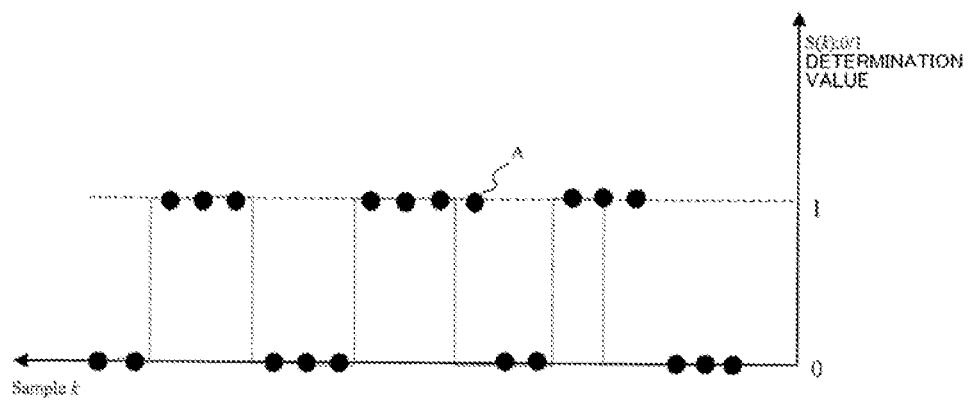
FIG. 5 is an illustration for explaining a signal binarized by a determination unit of the terminal device according to the present invention.

The threshold value determination unit 37 uses a preset threshold value $p_{th}$ to binarize (1/0) the optical signal received by the optical sensor information acquisition unit 31. FIGS. 4 and 5 are illustrations for explaining processing performed by the threshold value determination unit 37. First, the reception signal is input from the sensor information acquisition unit 31 to the threshold value determination unit 37. As illustrated in FIG. 4, the threshold value determination unit 37 samples this electric signal more finely than an optical ID pattern. Here, the phrase "more finely than an optical ID pattern" means "at an interval shorter than the length (time width) of each bit constituting the optical ID". In the example of FIG. 4, the fineness is an interval that allows three samplings for each of the bits representing an optical ID. In FIG. 4, p(k) is a sampling value and k is a sampling number. The sampling value may be a high value or a low value with respect to the true value due to various factors. Now, attention is paid to a sampling value p(k−2).

The threshold value determination unit 37 determines that S(k)=1 for p(k)≥$p_{th}$, and determines that S(k)=0 for p(k)<$p_{th}$, thus binarizing the received signal. Here, S(k) is a determination value of 1 or 0 obtained by the threshold value determination unit 37 with respect to the illuminance p(k) of the sampling number k. FIG. 5 is an illustration in which the sampling values in FIG. 4 are binarized with the threshold value $p_{th}$. Here, the sampling value p(k−2) is required to be correctly determined to be "0", but is erroneously determined to be "1" (as a point A) due to a large influence of noise.

Figure 6:
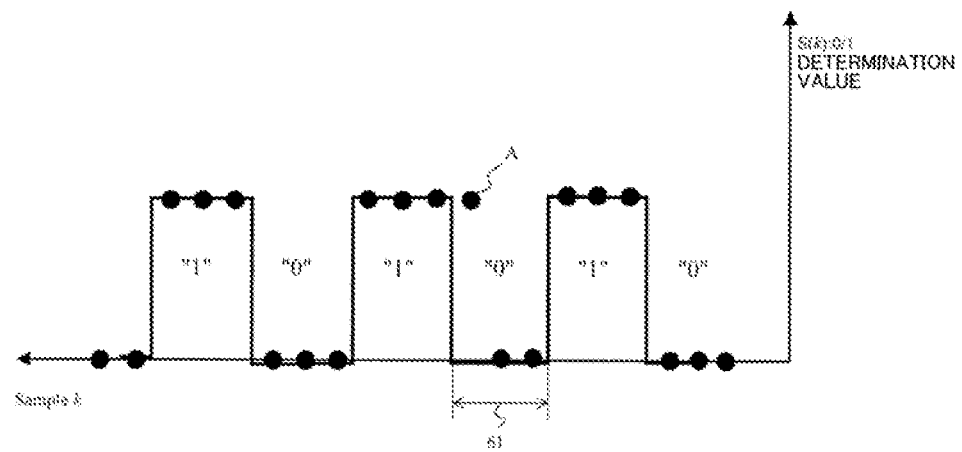
FIG. 6 illustrates processing in an analysis unit of the terminal device according to the present invention.
Figure 7:
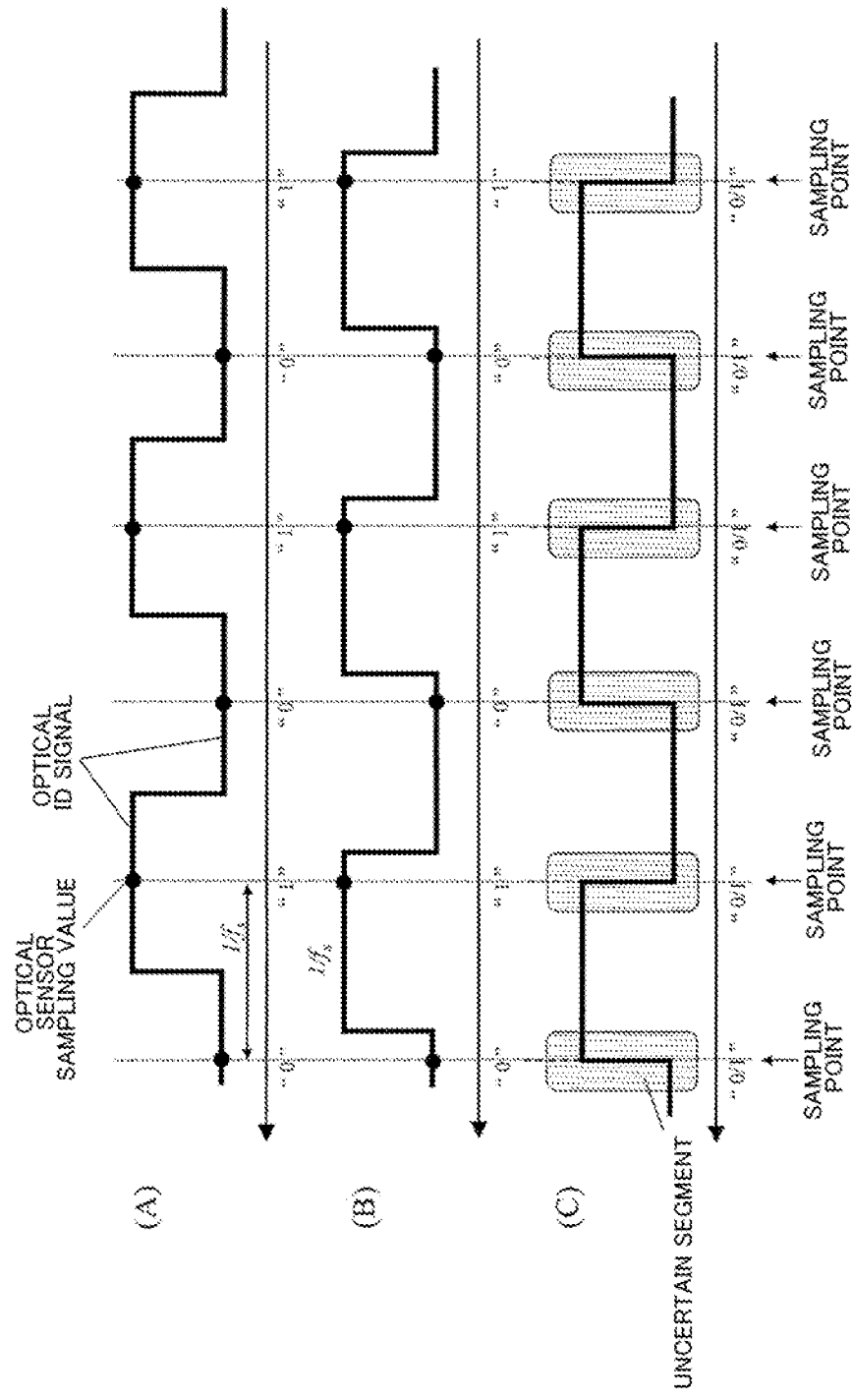
FIG. 7 illustrates a correspondence list of the terminal device according to the present invention.

The optical ID estimation unit 34 estimates each bit value of the reception signal by a majority decision method using a determination processing window. FIG. 6 is a bit pattern of the reception signal estimated by the optical ID estimation unit 34. Since the optical ID estimation unit 34 estimates the bit values by the majority decision method, the correct bit value of one bit 61 can be acquired regardless of the influence of the point A. The majority decision method performed by the optical ID estimation unit 34 will be described later.

Figure 9:
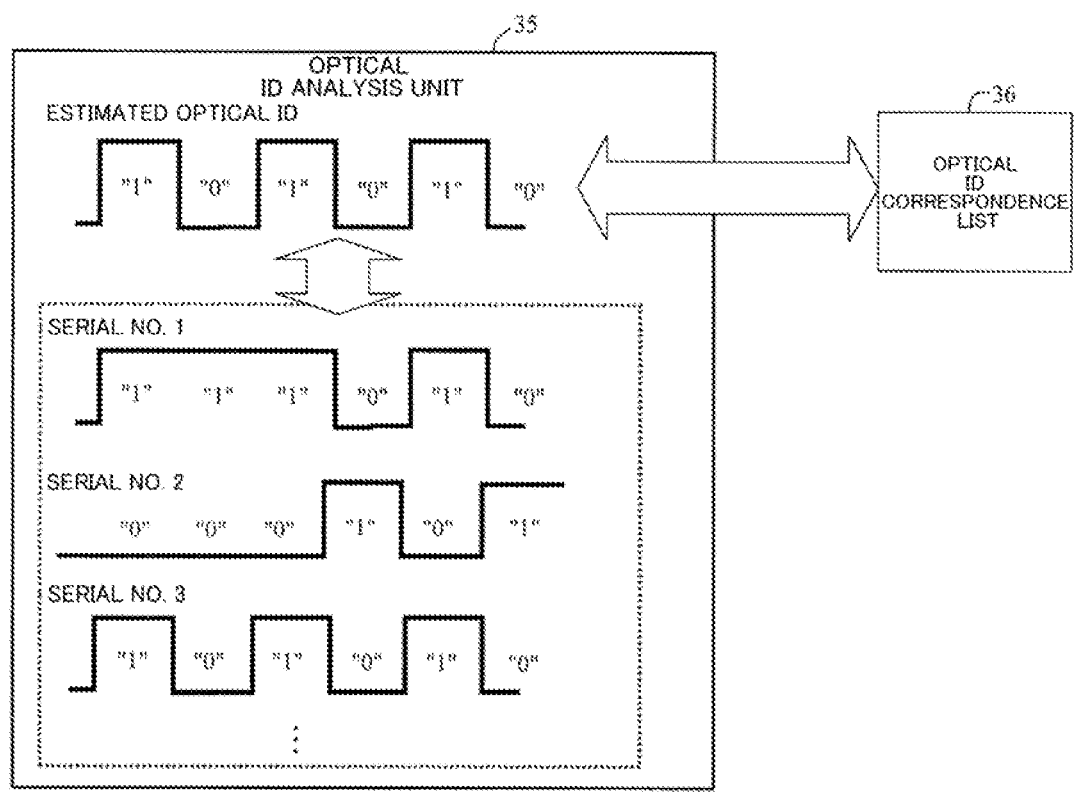
FIG. 9 illustrates processing in a calculation unit of the terminal device according to the present invention.

The optical ID analysis unit 35 extracts an optical ID from the bit pattern estimated by the threshold value calculation unit 34. FIG. 9 is an illustration for explaining processing performed by the optical ID analysis unit 35. The optical ID analysis unit 35 compares the input bit pattern with the stored signal shapes of optical IDs, and extracts an optical ID with the signal shape having the maximum correlation. Subsequently, the optical ID analysis unit 35 refers to the optical ID correspondence list 36 for the optical ID, and selects the corresponding connection operation and authentication information from the optical ID correspondence list 36. The description content of the optical ID correspondence list 36 is the same as that of the optical ID correspondence list 26 of the base station 20. FIG. 10 illustrates an example of the optical ID correspondence list 36.

The RF transmission and reception unit 33 transmits and receives RF wireless signals by using the protocol. That protocol is Wi-Fi, LTE, or the like. For example, a plurality of wireless standards such as 2.4 GHz/5 GHz Wi-Fi may be supported. The RF transmission and reception unit 33 transmits the connection operation and authentication information extracted by the optical ID analysis unit 35 to the base station 20.

Majority Decision Method

Figure 8:
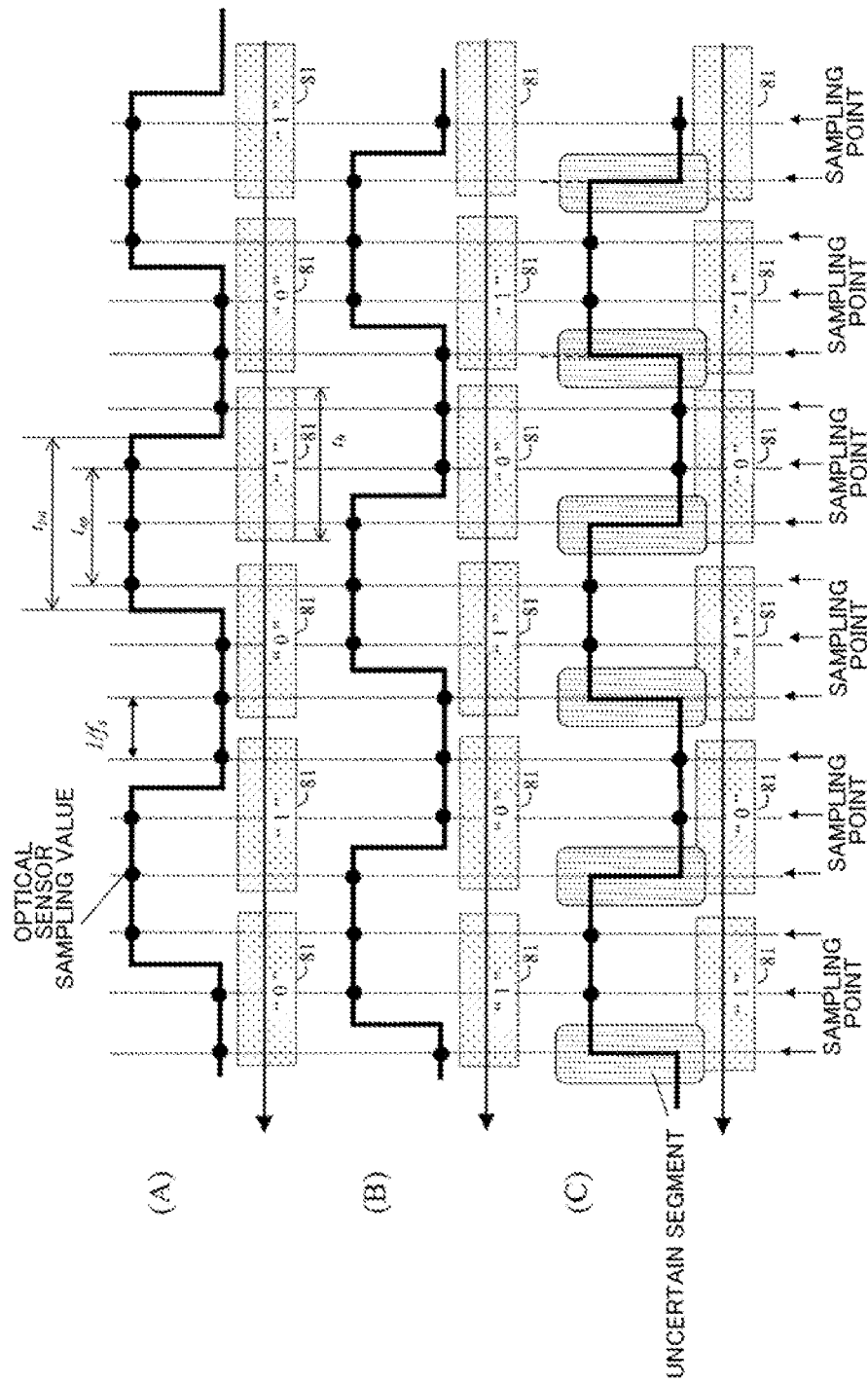
FIG. 8 is an illustration for explaining a problem to be solved by the present invention.

FIG. 8 is an illustration for explaining the majority decision method performed by the optical ID estimation unit 34. FIG. 8 illustrate a state in which the transmitting side and the receiving side are not synchronized. FIGS. 8 (A) and 8 (B) are cases where all sampling points are not in the uncertain segment, and FIG. 8 (C) is a case where one of the sampling points is in the uncertain segment.

The optical ID estimation unit 34 has a determination processing window 81 used for performing a majority decision. A time (determination time) to of the determination processing window 81 is shorter than a time width $t_{bit}$ of one bit of the bit pattern and longer than a time corresponding to a sum of n intervals of sampling points (1/$f_s$×n) included in the one bit of the bit pattern. In the example of FIG. 8, since 3 sampling points are included in the time width $t_{bit}$ of the one bit, the number n of sampling points to be summed is 2. Therefore, the determination time is as follows.

$1/f_s \times 2 < t_h < t_{bit}$

The majority decision method is as follows. The optical ID estimation unit 34 performs a majority decision on which determination value (0/1) is a majority in the determination processing window 81 for the binarized data. Specifically, when the number of observed points with a determination value of "1" in a determination processing window 81 is 2 or 3, "1" is assigned to that determination processing window 81 (bit), and when the number of observed points with a determination value of "1" in a determination processing window 81 is 0 or 1, "0" is assigned to that determination processing window 81 (bit).

Such a majority decision makes it possible to avoid erroneous bit determination not only when all the sampling points are not in an uncertain segment as illustrated in FIGS. 8 (A) and 8 (B), but also when one of the sampling points is in an uncertain segment as illustrated in FIG. 8 (C).

Such a majority decision also makes it possible to avoid bit erroneous determination even if the sample A to be erroneously determined illustrated in FIG. 5 is included.

Second Embodiment

Figure 11:
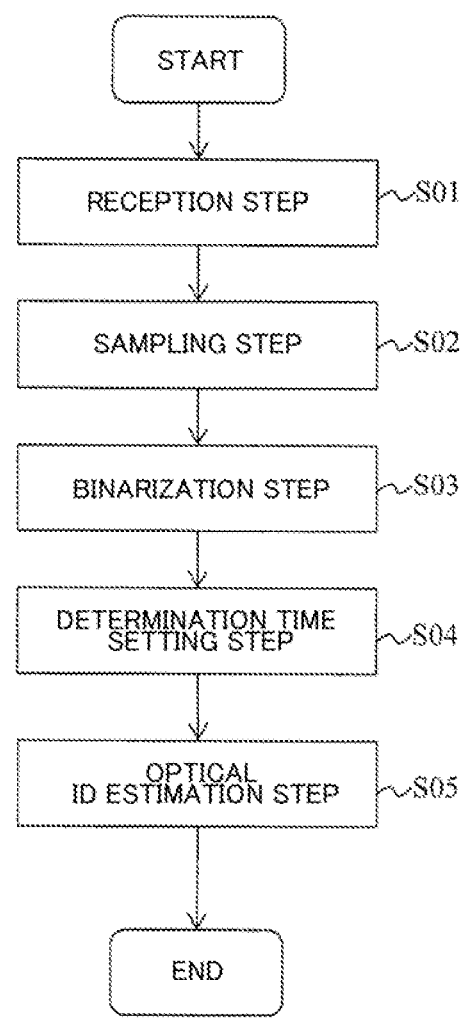
FIG. 11 is a diagram illustrating a configuration of a terminal device of the communication system according to the present invention.

FIG. 11 is a flowchart illustrating an operation (communication method) of the terminal device 30 described in the first embodiment. The present communication method is a communication method in which communication between the terminal device 30 and the base station 20 is performed by an optical wireless communication and an RF wireless communication, the communication method including:
  by the terminal device 30,
  by the terminal device,
  receiving an optical signal of the optical wireless communication from the base station (step S01);
  sampling illuminances of the optical signal at sampling points more finely than a bit pattern of the optical signal to acquire sampling values (step S02);
  comparing the sampling values with a certain threshold value to convert the optical signal into binary values (step S03);
  setting a determination time shorter than a time width of one bit of the bit pattern and longer than a time corresponding to a sum of intervals of the sampling points included in the one bit of the bit pattern (step S04); and
  estimating ID information included in the optical signal in such a manner that a major value of the binary values included in the determination time is set as a value of the one bit (step S05).

In steps S01 and S02, the optical sensor information acquisition unit 31 converts the optical signals from the base station 20 into electric signals to sample optical illuminance values.

In step S03, the threshold value determination unit 37 uses a predetermined threshold value to binarize (1/0) the optical signal based on the sampling values acquired in steps S01 and S02. The threshold value determination unit 37 determines that S(k)=1 for p(k)≥$p_{th}$, and determines that S(k)=0 for p(k)<$p_{th}$, thus binarizing the received signal.

In step S04, the optical ID estimation unit 34 sets the determination processing window 81 described with reference to FIG. 8.

In step S05, the optical ID estimation unit 34 determines each bit value of the reception signal from the binarized data by the majority decision method.

Figure 12:
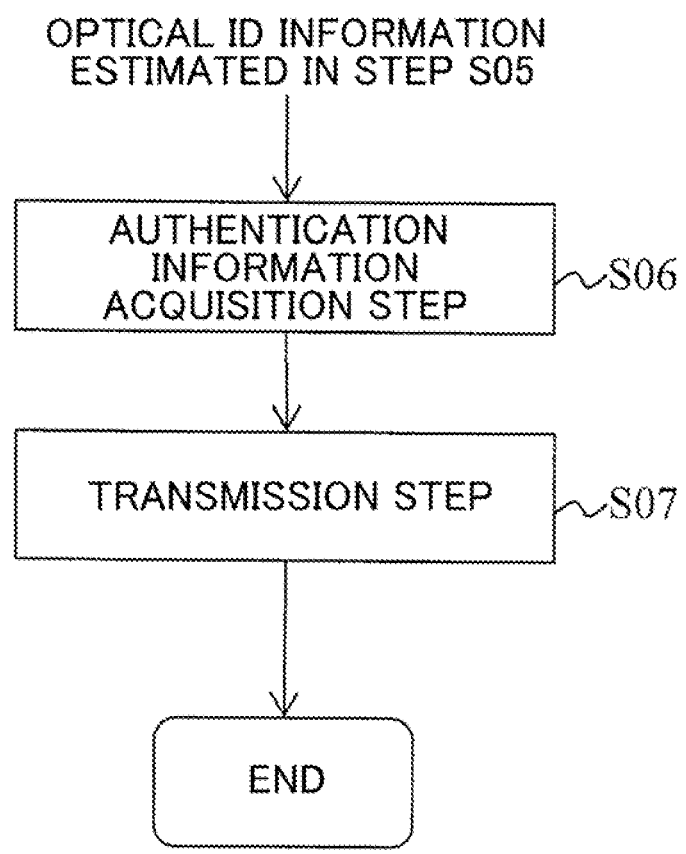
FIG. 12 illustrates processing in a calculation unit of the terminal device according to the present invention.

FIG. 12 is a flowchart illustrating an operation (communication method) of the terminal device 30 described in the first embodiment. In the present communication method, the following operation may be performed after the operation described with reference to FIG. 11. Specifically, the present communication method further includes:

referring to a list (the optical ID correspondence list 36), which describes a correspondence between ID information and authentication information for starting the RF wireless communication, for the estimated ID information to acquire the corresponding authentication information (step S06); and transmitting the authentication information to the base station 20 by the RF wireless communication (step S07).

The authentication information transmitted in step S07 is received by the base station 20. Then, the terminal device 30 for which the matching of the authentication information has been confirmed by the connection and authentication control unit 27 is permitted to communicate with the upper-level NW 10.

Notes

The present invention is an improvement of a mechanism for estimating each bit value (0/1) of a reception signal in analysis processing of the reception signal acquired by an illuminance sensor.

Specifically, the present invention samples an optical signal more finely than a 0/1 bit pattern in optical ID estimation processing for determining which of 1/0 the data acquired by an optical sensor is, and performs a majority decision using a plurality of sampling values in a decision processing window.

Effects of the Invention

According to the present invention, it is possible to perform asynchronous reception with a low error rate without using a synchronization code (preamble), and reduce the time required for user authentication or the like.

10 Upper-level network
20 Base station
21 Optical transmission unit
22 RF transmission and reception unit
24 Beam control unit
25 Optical signal control unit
26 Base station-side optical ID correspondence list
27 Connection and authentication control unit
30 Terminal
31 Optical sensor information acquisition unit
33 RF transmission and reception unit
34 Optical ID estimation unit
35 Optical ID analysis unit
36 Terminal-side optical ID correspondence list
40 Area
61 One bit
81 Determination processing window

The invention claimed is:

1. A terminal device that communicates with a base station by an optical wireless communication and an RF (Radio Frequency) wireless communication, the terminal device comprising:

an optical sensor that receives an optical signal of the optical wireless communication from the base station;

a determination unit that samples illuminances of the optical signal at sampling points more finely than a bit pattern of the optical signal to acquire sampling values, and compares the sampling values with a certain threshold value to convert the optical signal into binary values; and an estimation unit that has a determination time shorter than a time width of one bit of the bit pattern and longer than a time corresponding to a sum of intervals of the sampling points included in the one bit of the bit pattern, and estimates ID information included in the optical signal in such a manner that a major value of the binary values included in the determination time is set as a value of the one bit.

2. The terminal device according to claim 1, further comprising:

a list describing a correspondence between ID information and authentication information for starting the RF wireless communication;

an analysis unit that refers to the list for the ID information estimated by the estimation unit to acquire the corresponding authentication information; and an RF transmission and reception unit that transmits the authentication information acquired by the analysis unit to the base station by the RF wireless communication.

3. A communication method for performing communication between a terminal device and a base station by an optical wireless communication and an RF (Radio Frequency) wireless communication, the communication method comprising:

by the terminal device, receiving an optical signal of the optical wireless communication from the base station;

sampling illuminances of the optical signal at sampling points more finely than a bit pattern of the optical signal to acquire sampling values;

comparing the sampling values with a certain threshold value to convert the optical signal into binary values;

setting a determination time shorter than a time width of one bit of the bit pattern and longer than a time corresponding to a sum of intervals of the sampling points included in the one bit of the bit pattern; and estimating ID information included in the optical signal in such a manner that a major value of the binary values included in the determination time is set as a value of the one bit.

4. The communication method according to claim 3, further comprising:

referring to a list, which describes a correspondence between ID information and authentication information for starting the RF wireless communication, for the estimated ID information to acquire the corresponding authentication information; and transmitting the authentication information to the base station by the RF wireless communication.

5. A communication system in which communication between a terminal device and a base station is performed by an optical wireless communication and an RF (Radio Frequency) wireless communication, wherein the terminal device includes:

an optical sensor that receives an optical signal of the optical wireless communication from the base station;

a determination unit that samples illuminances of the optical signal at sampling points more finely than a bit pattern of the optical signal to acquire sampling values, and compares the sampling values with a certain threshold value to convert the optical signal into binary values; and an estimation unit that has a determination time shorter than a time width of one bit of the bit pattern and longer than a time corresponding to a sum of intervals of the sampling points included in the one bit of the bit pattern, and estimates ID information included in the optical signal in such a manner that a major value of the binary values included in the determination time is set as a value of the one bit.

6. The communication system according to claim 5, wherein the terminal device further includes:
   a list describing a correspondence between ID information and authentication information for starting the RF wireless communication;
   an analysis unit that refers to the list for the ID information estimated by the estimation unit to acquire the corresponding authentication information; and
   an RF transmission and reception unit that transmits the authentication information acquired by the analysis unit to the base station by the RF wireless communication.

* * * * *